(12) United States Patent
Sylvain et al.

(10) Patent No.: US 8,494,552 B2
(45) Date of Patent: Jul. 23, 2013

(54) METHOD FOR PERFORMING CONFIGURABLE ACTIONS BASED UPON MOBILE DEVICE DETECTION

(75) Inventors: Dany Sylvain, Gatineau (CA); David Lothrop, Carp (CA)

(73) Assignee: Genband US LLC, Frisco, TX (US)

( * ) Notice: Subject to any disclaimer, the term of this patent is extended or adjusted under 35 U.S.C. 154(b) by 306 days.

(21) Appl. No.: 12/860,594

(22) Filed: Aug. 20, 2010

(65) Prior Publication Data

US 2012/0046029 A1 Feb. 23, 2012

(51) Int. Cl.
  *H04W 24/00* (2009.01)
  *H04M 3/42* (2006.01)
(52) U.S. Cl.
  USPC ............... 455/456.1; 379/211.01; 379/211.02
(58) Field of Classification Search
  USPC ...................................... 455/456.1
  See application file for complete search history.

(56) References Cited

U.S. PATENT DOCUMENTS

| | | | |
|---|---|---|---|
| 7,145,437 B2 * | 12/2006 | Jalkanen et al. | 340/10.3 |
| 7,489,774 B2 * | 2/2009 | Agrawal et al. | 379/211.02 |
| 2007/0067734 A1 * | 3/2007 | Cunningham et al. | 715/779 |
| 2008/0096517 A1 * | 4/2008 | Appleyard et al. | 455/403 |

* cited by examiner

*Primary Examiner* — Melody Mehrpour
*Assistant Examiner* — Natasha Cosme
(74) *Attorney, Agent, or Firm* — Haynes and Boone, LLP

(57) ABSTRACT

A method for performing configurable actions based upon the detection of one or more mobile devices includes receiving from a detection point an identifier for each of one or more mobile devices detected within a detection perimeter associated with the detection point. The identifiers are then filtered to determine a change in status for each of the one or more mobile devices. An action is then performed based upon at least one of the determined changes in status for each of the one or more mobile devices.

33 Claims, 6 Drawing Sheets

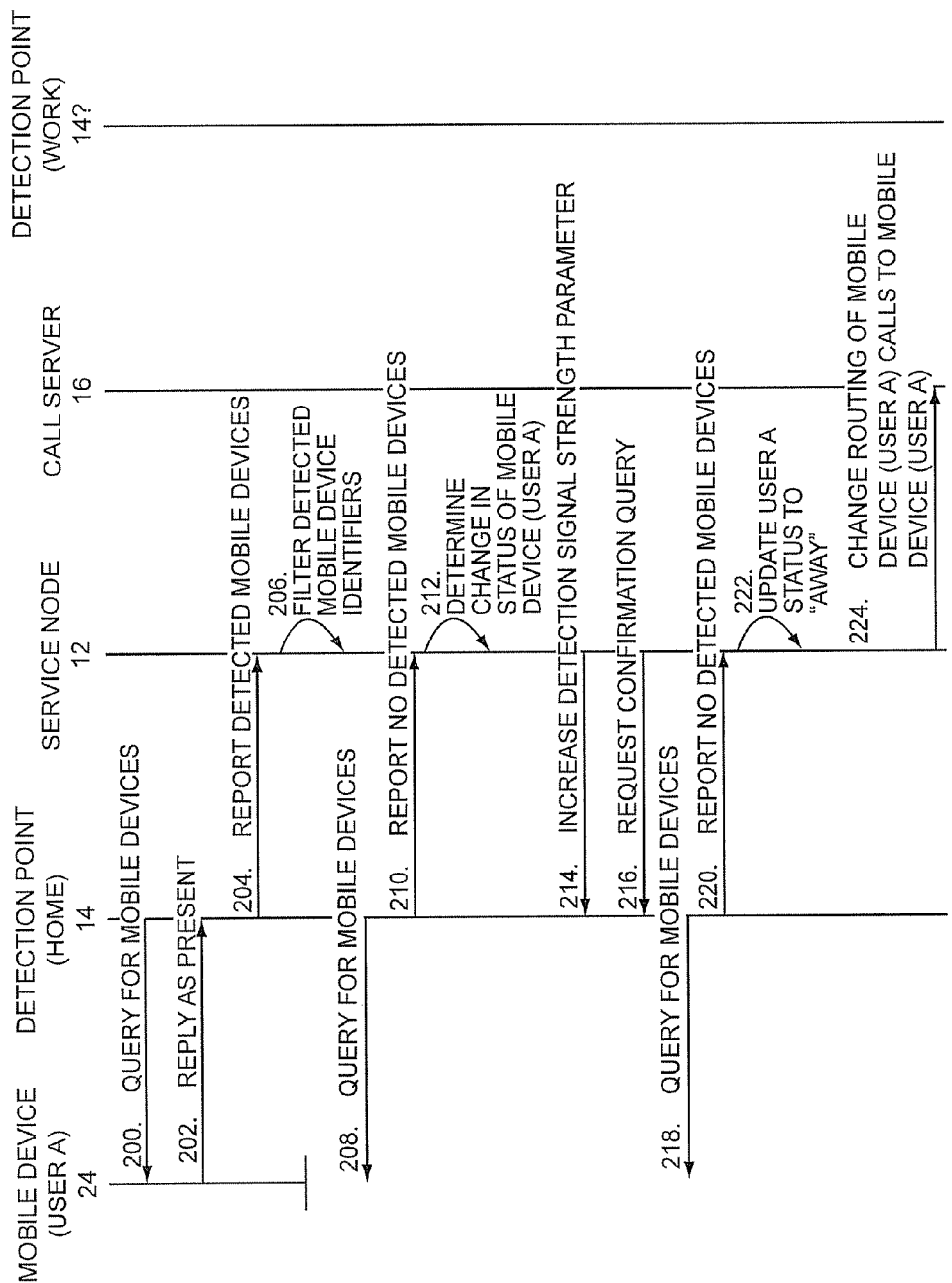

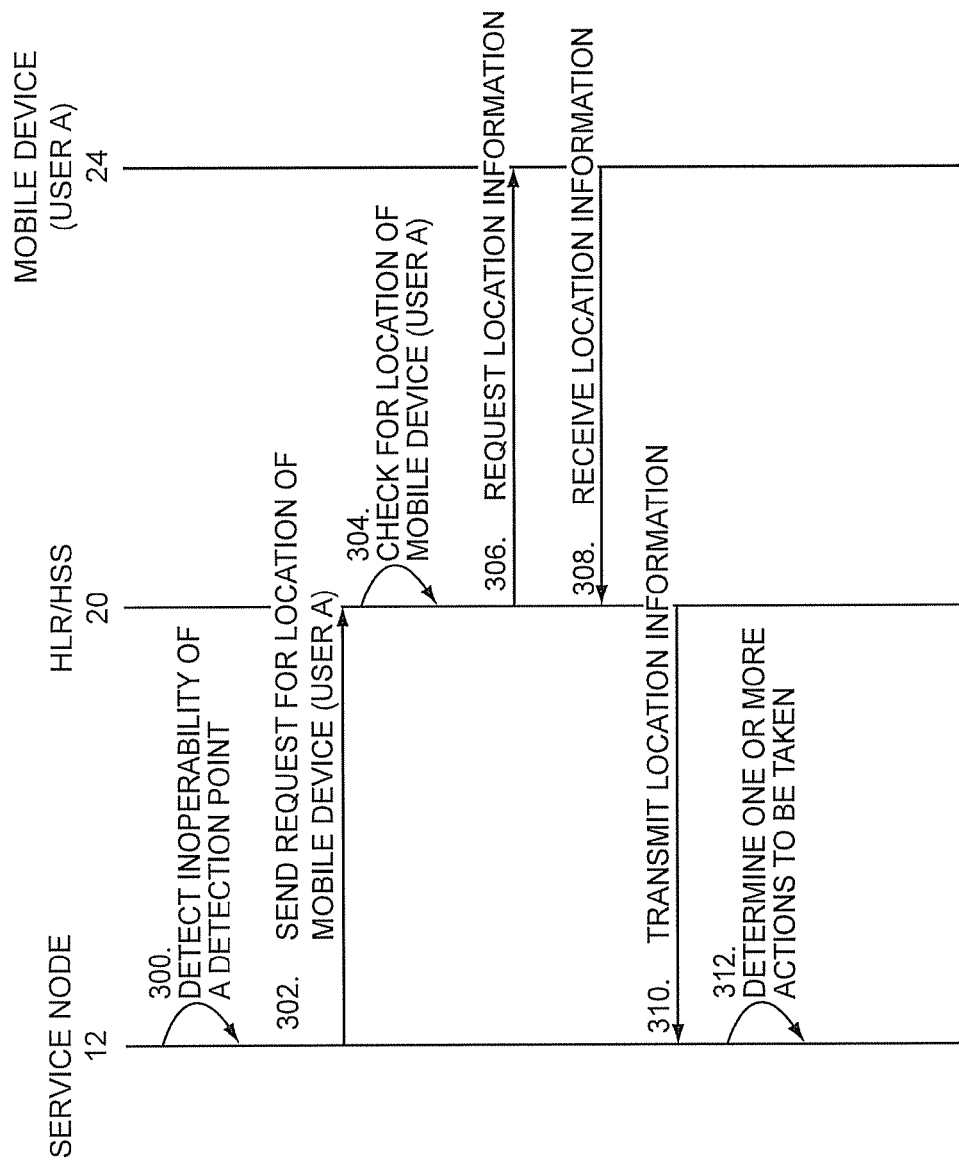

METHOD FOR PERFORMING CONFIGURABLE ACTIONS BASED UPON MOBILE DEVICE DETECTION

FIELD OF THE DISCLOSURE

The present disclosure relates to a method for determining and taking actions based upon a detected presence of a mobile device.

BACKGROUND

As the number of communication devices, such as cell phones, voice terminals, and the like, proliferate, there are likewise an increasing number of ways to statically configure the interaction between such devices. For example, a simring may be employed by a user of a cell phone so that calls to the cell phone likewise ring at voice terminals within the user's home. However, when a home phone is shared across multiple people at a home and the user is away from the home phone, calls to the user's cell phone may result in a disruption to other people within the home. In addition, calls to the user's cell phone may be answered by someone in the user's home before the user has the opportunity to answer the cell phone.

Given the apparent desire for individuals to configure the operation of communication components in accordance with their personal preferences, there is a need for an effective and efficient technique to allow users to configure actions to be taken within a communication environment based, at least in part, on a detection of the user's location.

SUMMARY OF THE DETAILED DESCRIPTION

In an exemplary and non-limiting embodiment, a method for performing configurable actions based upon the detection of one or more mobile devices comprises receiving from a detection point an identifier for each of one or more mobile devices detected within a detection perimeter associated with the detection point. The identifiers are then filtered to determine a change in status for each of the one or more mobile devices. An action is then performed based upon at least one of the determined changes in status for each of the one or more mobile devices.

In another exemplary and non-limiting embodiment, a service node for performing configurable actions based upon the detection of one or more mobile devices comprises at least one communication interface and a control system associated with the at least one communication interface. The control system is adapted to receive from a detection point an identifier for each of one or more mobile devices detected within a detection perimeter associated with the detection point. The control system is further adapted to filter the one or more identifiers to determine a change in status for each of the one or more mobile devices and perform an action based upon at least one of the determined changes in status for each of the one or more mobile devices.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

FIGS. 3A and 3B provide an exemplary communication flow according to another embodiment of the disclosure.

FIG. 4 provides an exemplary communication flow according to another embodiment of the disclosure.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

In an exemplary and non-limiting embodiment, a method for performing configurable actions based upon the detection of one or more mobile devices comprises receiving from a detection point an identifier for each of one or more mobile devices detected within a detection perimeter associated with the detection point. The identifiers are then filtered to determine a change in status for each of the one or more mobile devices. An action is then performed based upon at least one of the determined changes in status for each of the one or more mobile devices.

Figure 1:
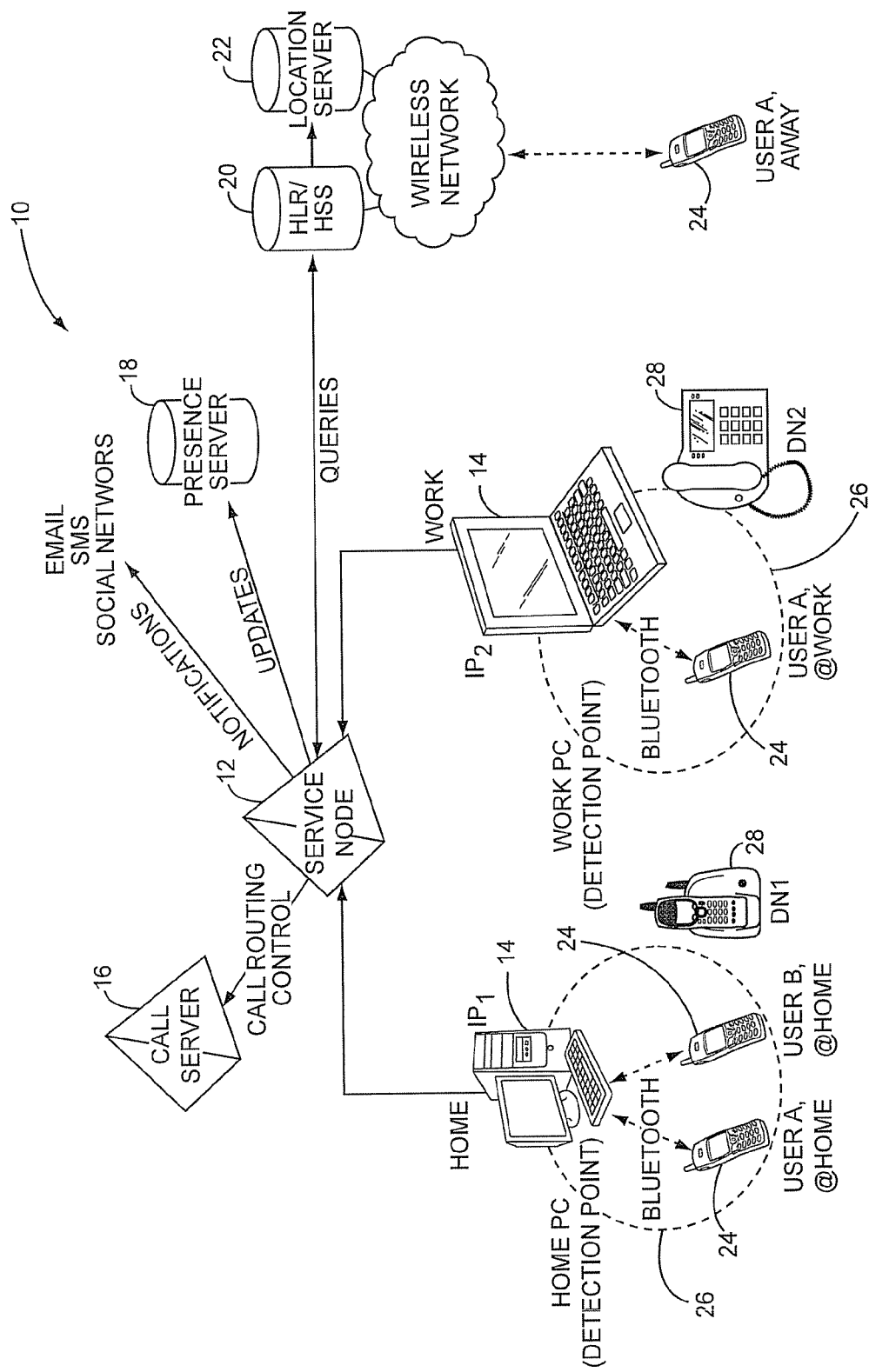
FIG. 1 is a block representation of a communication environment according to one embodiment of the disclosure.

Prior to delving into the details of select embodiments, an overview of an exemplary communication environment 10 is provided in association with FIG. 1. In general, a service node 12 is provided to facilitate communications among one or more detection points 14, a call server 16, a presence server 18, one or more home location register (HLR)/home subscriber servers (HSS) 20, and a location server 22. Each detection point 14 operates to query for the presence of one or more mobile devices 24 located within a detection perimeter 26. For example, a detection point 14 may utilize Bluetooth communications to query for any mobile devices 24 in sufficient proximity to the detection point 14 to be detected by the detection point 14. While illustrated as encompassing a static area, as described more fully below, the area comprising a detection perimeter 26 may vary based upon, for example, the mode of detection employed and, for a given mode of detection, the parameters associated with a detection attempt. Further, there may be one or more voice terminals 28 near to and associated with a detection point 26.

The attributes and function of each of these components noted above are described more fully below. As illustrated, the lines extending between various components indicate modes of communication by which elements and components are communicatively coupled. As described more fully below, such modes of communication include, but are not limited to, both packet-based and circuit switched communication.

In general, and in accordance with exemplary and non-limiting embodiments disclosed herein, the service node 12 receives triggered updates from the one or more detection points 14 corresponding to changes in the number and identity of the one or more mobile devices 24 within a detection perimeter 26 corresponding to each of the detection points 14. Such changes are indicative of movement by a user or operator of a mobile device 24 both into and out of one or more detection perimeters 26. As illustrated and for purposes of clarity, each mobile device 24 is labeled with a user identifier followed by a status identifier. For example, a first mobile device 24 is identified as "User A, @home." In this example, the mobile device 24 is operated by a first user A having a status indicating the user A is at home. Likewise, in order to illustrate the same mobile device 24 in another scenario, elsewhere the same mobile device 24 is identified as "User A, @work." In this instance, the same mobile device 24 is illustrated as having geographic location associated with a work environment. As illustrated, different detection points 14 are addressed by unique addresses. In the example illustrated, the detection point 14 associated with user A's home is shown as having an IP address of $IP_1$. Likewise, the detection point 14 associated with user A's work is shown as having an IP address of $IP_2$.

In general, the detection by a detection point 14 of a change in location of a mobile device 24 is used as a proxy for the status of the user associated with the device 24. Therefore, when a change in the location of a user of a mobile device 24 is detected or otherwise determined by the service node 12, the service node 12 may take one or more actions in response thereto. Such actions are configurable by the user of the mobile device 24 and include, but are not limited to, routing incoming calls to a simring, changing a status of the user in a user profile, informing others of the user's change in status, and the like.

Figure 2:
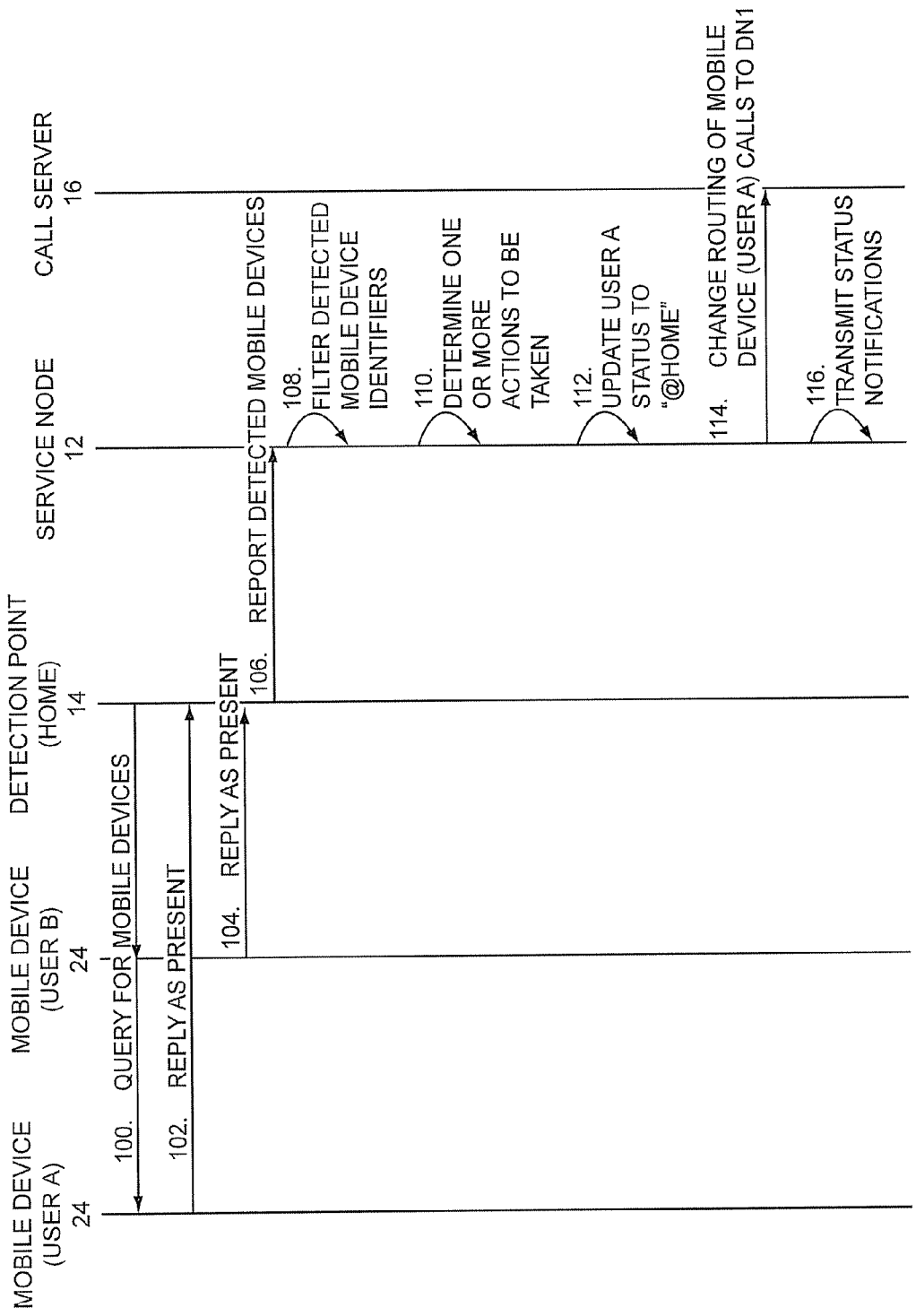
FIG. 2 provides an exemplary communication flow according to one embodiment of the disclosure.

FIG. 2 is a communication flow diagram illustrating the flow of information arising from user A operating a mobile device 24 and entering into a detection perimeter 26 extending from a detection point 14 situated in a home environment. First, the detection point 14 interrogates or otherwise queries within the detection perimeter 26 to determine the presence of one or more mobile devices 24 (step 100). In an exemplary embodiment, the detection point 14 engages in Bluetooth communication to determine one or more mobile devices 24 within the detection perimeter 26. While illustrated as employing Bluetooth communication, any and all modes of querying may be employed that are capable of uniquely identifying individual mobile devices 24. Examples of such querying modes include, but are not limited to, infrared (IR) communication, Radio Frequency Identification (RFID) interrogation, and the like. In an exemplary embodiment, the detection point 14 is configured to query for existing mobile devices 24 at predetermined regular intervals. For example, the detection point 14 may issue a query every thirty (30) seconds. The parameters defining the length of time between such predetermined intervals may form a part of system parameters stored at each detection point 14 or, alternatively, may be stored centrally at the service node 12. As described more fully below, parameters defining the length of time between such predetermined intervals, as well as other parameters (e.g., the signal strength of an interrogation signal) may assume a default value and may be changed in response to triggers.

Next, in response to receiving the query from the detection point 14, the mobile device 24 of user A engages in communication with the detection point 14 to indicate its presence within the detection perimeter 26 (step 102). Likewise, the mobile device 24 of another user, user B, engages in communication with the detection point 14 to indicate its presence within the detection perimeter 26 (step 104). In the present example, the mobile device 24 of user A is entering into the detection perimeter 26 from elsewhere while the mobile device 24 of user B has been resting in a substantially stationery manner within the detection perimeter 26 for a period of time sufficient to have been previously queried by the detection point 14. While illustrated as both mobile devices 24 engaging in active communication with the detection point 14, such communication may be partially passive, as when one or more of the mobile devices 24 are detected via passive RFID tags attached to or otherwise associated with the location of a mobile device 24.

Next, the detection point 14 communicates with the service node 12 to report the presence of the mobile devices 24 (step 106). Specifically, the detection point 14 transmits a unique mobile device identifier for each detected mobile device 24. In an exemplary embodiment, the detection point 14 is triggered by the responses from the mobile devices 24 to report the information to the service node 12. In the present example, the detection point 14 is a computer capable of communicating, such as via Bluetooth, with the mobile devices 24 and communicatively coupled to the service node 12, such as via a packet based communication network, such as the Internet.

The service node 12 has stored within it and accessible to it system configuration information including information defining at least an identity and an address for each detection point 14 communicatively coupled to the service node 12. In addition to the identity information, the service node 12 may likewise store or have access to information defining various parameters such as, for example, a location and identity of each detection point 14 and user information. User information may include a user identifier (user ID), user preferences, mobile device 24 identifiers associated with the user, detection point 14 identifiers, user location status, one or more picture identifiers, and the like. As described more fully below, user preferences may define the manner in which the service node 12 is to react when triggered by a change in the detection of a mobile device 24 associated with a user. For example, a user of a mobile device 24 may request that, when it is determined that the mobile device 24 is within a detection perimeter 26 associated with the user's home, incoming calls be routed, via a simring, to one or more voice terminals 28 located within the user's home. In an exemplary embodiment, the mobile device 24 identifiers may be the phone numbers associated with each mobile device 24 operated by the user.

Upon receiving information identifying each mobile device 24 detected by the detection point 14, the service node 12 proceeds to filter the received mobile device 24 identifiers (step 108). The filtering process operates to identify which mobile devices 24, out of all the mobile devices 24 detected by a detection point 14, are associated with users of the communication environment 10. For example, in addition to detecting the presence of the mobile device 24 of user A and the mobile device 24 of user B, the detection point 14 may likewise detect a laptop computer associated with user A, a Global Positioning System (GPS) device associated with user A, as well as numerous devices owned by neighbors of user A and residing in the homes of neighbors that are located within the detection perimeter 26 of the detection point 14.

When the identifiers of each device detected by the detection point 14 are received by the service node 12, the service node 12 performs a query of the stored system parameters and user information associated with each device. In the present example, the service node 12 receives, in response to one or more queries, information confirming that the identifier associated with the mobile device 24 of user A is associated with a user, user A, for whom there is stored user information. Likewise, the service node 12 receives information confirming that the identifier associated with the mobile device 24 of user B is associated with a user, user B, for whom there is stored user information. Further, in the present example, when the service node 12 discovers that there is no accessible data or information associated with the various other device identifiers reported by the detection point 14, the service node 12 effectively filters out such device identifiers as candidates for triggering additional actions.

As is evident, because a detection point 14 is capable of detecting a relatively large number of devices which are configured to form a part of the communication environment 10 and, because a plurality of detection points 14 may each be configured to report detected mobile devices 24 to the service node 12, the collective messaging volume required to repeatedly report detected mobile devices 24 from each detection point 14 to the service node 12 may be prohibitive or otherwise undesirable. As a result, in an exemplary embodiment, the process of filtering the detected mobile device 24 identifiers may be pushed down to the detection point 14 level. In such an instance, each detection point 14 has stored upon it or accessible by it the stored system parameters and user information associated with each mobile device 24.

Next, the service node 12 determines one or more actions to be taken in response to the detection of the one or more mobile devices 24 (step 110). In the present example, the mobile device 24 associated with user B has been previously detected. As a result, when the service node 12 queries the user information in step 108, the service node 12 retrieves a status for the mobile device 24 of user B of "@home." The service node 12 is likewise able to query information associated with the detection point 14 so as to establish that the detection point 14 is associated with user B's home. The service node 12 is therefore able to ascertain that the user status of user B is unchanged. Conversely, in the present example, it is assumed that the mobile device 24 of user A is newly detected within the detection perimeter 26 associated with the detection point 14 at user A's home. For example, when the service node 12 queries the user information in step 108, the service node 12 retrieves a status for the mobile device of user A of "away." The service node 12 is likewise able to query information associated with the detection point 14 so as to establish that the detection point 14 is associated with user A's home. As a result, the service node 12 determines that user A is coming from somewhere else and has entered into proximity with user A's home.

In response, the service node 12 performs a first action based upon the determined change of status for user A. In the present example, the service node 12 proceeds to access and update a user status field of the user information from "away" to "@home" (step 112). As illustrated, the user information is stored at the service node 12, such as in a database forming a part of the service node 12. In another exemplary embodiment, user information related to a status of a user may be stored in the presence server 18 communicatively coupled to the service node 12 and may be updated as required. In another example, various attributes associated with user A, such as via user A's user profile, may be changed or otherwise altered to reflect the change of status for user A. In an exemplary embodiment, a picture identifier (picture ID) comprising an image may be changed to reflect the change in user A's status. For example, a picture associated with user A may be changed to an image of user A lounging around user A's home.

In an exemplary embodiment, various actions to be taken by the service node 12 in response to a detection of a mobile device 24 that results in a change to a status of the mobile device 24 associated with a user may be defined by a user and stored as accessible by the service node 12 as, for example, user information or as a system parameter. For example, a user may define as part of an associated user profile comprising a part of the user information that when a mobile device 24 associated with user A is detected at user A's home, calls to the mobile device 24 are to be routed so as to simring one or more voice terminals 28 at user A's home. As illustrated in FIG. 1, the home voice terminal 28 is associated with a directory number DN1. In an exemplary embodiment, the service node 12, having determined to change the routing of incoming calls to user A based upon the change in status of the mobile device 24 of user A and the preferences of user A retrieved from the user profile of user A, communicates with and instructs the call server 16 to forward calls to the mobile device 24 of user A to the voice terminal 28 directory number DN1 (step 114).

In an exemplary embodiment, another action that may be performed by the service node 12 in response to a change in status of a mobile device 24 associated with a user is the transmission of one or more status notifications to designated destinations (step 116). Modes for sending such status notifications include, but are not limited to, sending messages via email, Short Message Service (SMS), Instant Messaging (IM), and the like. The address and/or destination identifiers of the parties to whom the messages are sent may be defined in one or more user profiles accessible by the service node 12. For example, user A may associate a mobile device 24, such as a cell phone, with himself in a user profile while similarly storing in the user profile a phone number of a family member to whom a text message is to be sent when user A arrives within the detection perimeter 26 of a detection point 14 associated with user A's home. In the present example, upon entering user A's home and being detected by a detection point 14 associated with the home, the resulting change in user A's status causes the service node 12, in accordance with user A's profile instructions, to send a text message to user A's spouse, wherein the text message reads, "User A arrived home @ 5:35 PM." In another exemplary embodiment, in response to user A's change in status, the service node 12 may update an entry on user A's social networking site so that user A's status is available to social network friends of user A.

Figure 3B:
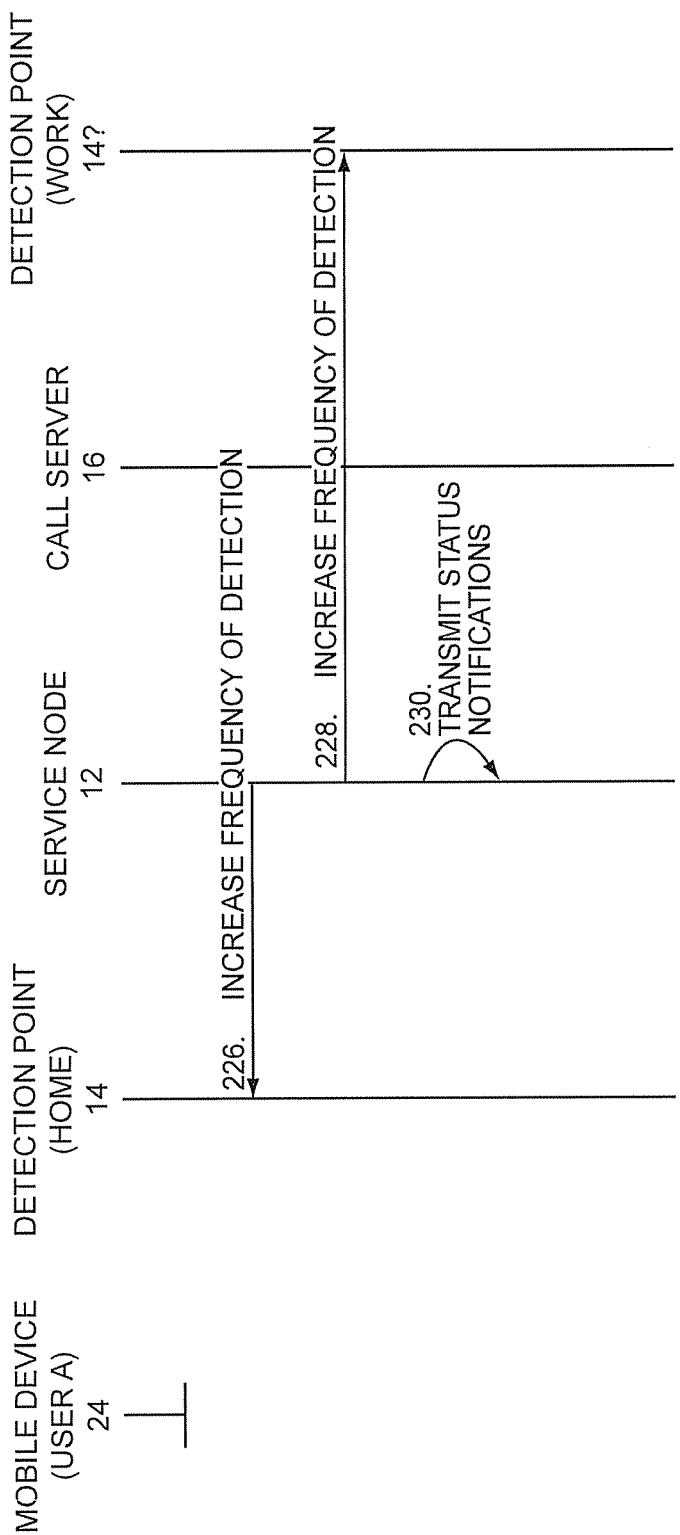

FIGS. 3A and 3B are communication flow diagrams illustrating the flow of information arising from user A operating a mobile device 24 within a detection perimeter 26 extending from a detection point 14 situated in a home environment and then leaving the detection perimeter 26. First, the detection point 14 interrogates or otherwise queries within the detection perimeter 26 to determine the presence of one or more mobile devices 24 (step 200). In an exemplary embodiment, the detection point 14 engages in communication to determine one or more mobile devices 24 within the detection perimeter 26. In an exemplary embodiment, the detection point 14 is configured to query for existing mobile devices 24 at predetermined regular intervals. For example, the detection point 14 may issue a query every thirty (30) seconds. The parameters defining the length of time between such predetermined intervals may form a part of system parameters stored at each detection point 14 or, alternatively, may be stored centrally at the service node 12. As described more fully below, parameters defining the length of time between such predetermined intervals, as well as other parameters (e.g., the signal strength of an interrogation signal), may assume a default value and may be changed in response to triggers.

Next, in response to receiving the query from the service node 12, the mobile device 24 of user A engages in communication with the detection point 14 to indicate its presence within the detection perimeter 26 (step 202). In contrast to the example of FIG. 1, in the present example, it is assumed that the mobile device 24 of user A is the only mobile device 24 within the home detection perimeter 26. The mobile device 24 of user A has been resting in a substantially stationery manner within the detection perimeter 26 for a period of time sufficient to have been previously queried by the detection point 14.

Next, the detection point 14 communicates with the service node 12 to report the presence of mobile devices 24 of user A (step 204). Specifically, the detection point 14 transmits a unique mobile device 24 identifier for the mobile device 24 of user A. In an exemplary embodiment, the detection point 14 is triggered by the response from the mobile device 24 to report the information to the service node 12. In the present example, the detection point 14 is a computer capable of communicating, such as via Bluetooth, with the mobile devices 24 and communicatively coupled to the service node 12, such as via a packet based communication network, such as the Internet.

The service node 12 has stored within it and/or accessible to it system configuration information including information defining at least an identity and an address for each detection point 14 communicatively coupled to the service node 12.

Upon receiving information identifying each mobile device 24 detected by the detection point 14, the service node 12 proceeds to filter the received mobile device 24 identifiers (step 206). The filtering process operates to identify which mobile devices 24, out of all the mobile devices 24 detected by a detection point 14, are associated with users of the communication environment 10. When the identifiers of each device detected by the detection point 14 are received by the service node 12, the service node 12 performs a query of the stored system parameters and user information associated with each device. In the present example, the service node 12 receives information confirming that the identifier associated with the mobile device 24 of user A is associated with a user, user A, for whom there is stored user information. In an exemplary embodiment, in addition to filtering the detected mobile device 24 identifiers to include only mobile device 24 identifiers associated with mobile devices 24 that are registered or otherwise configured as a part of the communication environment 10, the service node 12 further filters received mobile device 24 identifiers to disregard those associated with mobile devices 24 whose status has not changed since the last report from a detection point 14. As noted above, in the present example, the mobile device 24 of user A was previously detected in proximity to the detection point 14 associated with user A's home. As a result, no action is triggered by the continued presence of the mobile device 24 of user A.

Next, after a configurable and predetermined period of time, the detection point 14 once again interrogates or otherwise queries within the detection perimeter 26 to determine the presence of one or more mobile devices 24 (step 208). In the present example, it is assumed that at some point in between the performance of step 202 and step 208, the mobile device 24 of user A exits the detection perimeter 26 within which it was previously residing. This occurrence is illustrated as the termination of the vertical timeline descending downwards from the mobile device 24 of user A. As a result, the detection point 14 does not receive a reply from any mobile device 24 within the detection perimeter 26. The detection point 14 proceeds to report to the service node 12 that there are no mobile devices 24 detected (step 210).

Upon receiving the information from the detection point 14, the service node 12 proceeds once again to filter the detected mobile device 24 identifiers. As no mobile device 24 identifiers were detected, the filtering process results in a determination that the status of user A's mobile device 24 has changed (step 212). As illustrated, when the service node 12 determines that a mobile device 24 that was present within a detection perimeter 26 is no longer found to be present within the detection perimeter 26, the service node 12 may optionally act to request a confirmation from the detection point 14. In practice, when a mobile device 24 is located at or near the outermost boundaries of a detection perimeter 26, small movements of the mobile device 24 or changes to the environment around the detection point 14 may result in the mobile device 24 being alternately detectable and undetectable by subsequent queries from the detection point 14. In such instances, the desired status of the mobile device 24 (e.g., "@home") has not changed. Rather, the ability of the detection point 14 to detect the mobile device 24 has changed.

In an exemplary and non-limiting embodiment, the service node 12 may optionally first instruct the detection point 14 to increase the value of the parameter defining the detection signal strength (step 214). Next, the service node 12 requests a confirmation query from the detection point 14 (step 216). In response to the request for a confirmation query, the detection point 14 interrogates or otherwise queries within the detection perimeter 26 to determine the presence of one or more mobile devices 24 (step 218) and once again reports any and all detected mobile devices 24 to the service node 12 (step 220). While not illustrated, the service node 12 may optionally instruct the detection point 14 to return to the previous detection signal strength parameter.

After having determined a change in the status of the mobile device 24 of user A in step 212 and, after optionally confirming the change in status of user A's mobile device 24 in steps 214-220, the service node 12 performs a first action based upon the determined change of status for user A. In the present example, the service node 12 proceeds to access and update a user status field of the user information from "@home" to "away" (step 222). As illustrated, the user information is stored at the service node 12, such as in a database forming a part of the service node 12. In another exemplary embodiment, user information related to a status of a user may be stored in the presence server 18 communicatively coupled to the service node 12 and may be updated as required. In another example, various attributes associated with user A, such as via user A's user profile, may be changed or otherwise altered to reflect the change of status for user A. In an exemplary embodiment, a picture identifier (picture ID) comprising an image may be changed to reflect the change in user A's status. In the present example, a picture associated with user A may be changed to an image of A driving a car in transit to adventure.

As noted above, various actions to be taken by the service node 12 in response to a detection of a mobile device 24 that results in a change to a status of a mobile device 24 associated with a user may be defined by a user and stored as accessible by the service node 12 as, for example, user information or as a system parameter. For example, a user may define as part of an associated user profile comprising a part of the user information that when a mobile device 24 associated with user A is no longer detected at a detection point 14, calls previously routed to one or more voice terminals 28 are to be routed to user A's mobile device 24. As illustrated in FIG. 1, while detected by the detection point 14 associated with user A's home, incoming calls to user A's mobile device 24 were routed to a home voice terminal 28 associated with a directory number DN1. In an exemplary embodiment, the service node 12, having determined to change the routing of incoming calls to user A based upon the change in status of the mobile device 24 of user A and the preferences of the user A retrieved from the user profile of user A, communicates with and instructs the call server 16 to stop forwarding calls from the mobile device 24 of user A to the voice terminal 28 directory number DN1 (step 224).

In another exemplary embodiment, in response to the illustrated change in status of user A's mobile device 24, the service node 12 may instruct one or more detection points 14 to increase the frequency at which they query for nearby mobile devices 24. In the present example, the service node 12 requests both the detection point 14 associated with a home and a detection point 14 associated with a place of employment to increase the frequency at which they query for mobile devices 24 (steps 226 and 228). This may prove desirable particularly in instances where multiple detection points 14 are in close proximity to one another. In such instances, when user A leaves a first detection perimeter 26, user A is likely to soon enter into another second detection perimeter 26. By increasing the rate at which detection points 14 query for mobile devices 24, there is avoided the length of time that the status of user A is generically defined to simply be "away."

As described above with reference to FIG. 2, in an exemplary embodiment, another action that may be performed by the service node 12 in response to a change in status of a mobile device 24 associated with a user is the transmission of one or more status notifications to designated destinations (step 230). Modes for sending such status notifications include, but are not limited to, sending messages via email, SMS. IM, and the like. In the present example, upon leaving home and no longer being detected by a detection point 14 associated with the home, the resulting change in user A's status causes the service node 12, in accordance with user A's profile instructions, to send a text message to user A's spouse, wherein the text message reads, "User A left home @ 5:35 PM." In another exemplary embodiment, in response to user A's change in status, the service node 12 may update an entry on user A's social networking site so that user A's status is available to social network friends of user A.

FIG. 4 is a communication flow diagram illustrating the flow of information arising when a detection point 14 becomes inoperable. First, the service node 12 detects the inoperability of a detection point 14 (step 300). Such a detection may result, for example, from a personal computer (PC) comprising the detection point 14 entering into a sleep mode, wherein the detection point 14 ceases to perform queries for mobile devices 24. For example, in an instance where a detection point 14 is configured to transmit the mobile device 24 identifiers corresponding to detected mobile devices 24 to the service node 12 every thirty (30) seconds, the service node 12 may determine that a detection point 14 is temporarily inoperable when a period of time greater than thirty (30) seconds passes without receiving an update from the detection point 14.

Having determined the inoperability of a detection point 14, the service node 12 operates to send a request to one or more devices capable of establishing a location of one or more mobile devices 24 known to have been previously detectable by the detection point 14 prior to the detection point 14 becoming inoperable (step 302). In the present example, the service node 12 sends a request to the HLR/HSS 20 for location information corresponding to the mobile device 24 of user A. In an alternative embodiment, the service node 12 sends a request to the location server 22 on which location information corresponding to one or more mobile devices 24 is periodically stored. Upon receiving the request, the HLR/HSS 20 checks to see if it has location information corresponding to the mobile device 24 of user A stored (step 304). In the event that there is none such information available, the HLR/HSS 20 requests location information from the mobile device 24 of user A (step 306). In an exemplary embodiment, the HLR/HSS 20 may query the mobile device 24 for GPS derived location information. In response, the mobile device 24 replies with the requested location information (step 308). In other exemplary embodiments, the HLR/HSS 20 may engage in cell tower triangulation or any other method for determining a location of, for example, the mobile device 24 of user A.

After receiving the location information from the mobile device 24, the HLR/HSS 20 transmits the location to the service node 12 (step 310). Upon receiving the location information, the service node 12 determines one or more actions to be taken (step 312). In an exemplary embodiment, the service node 12 may retrieve a stored attribute parameter associated with the detection point 14 and comprising an approximate geographic location of the detection point 14. The service node 12 next compares the received location information of one or more mobile devices 24 to the geographic location of a detection point 14 to determine if the mobile device 24 has moved an amount sufficient to require a change to the status of the user associated with the mobile device 24.

Figure 5:
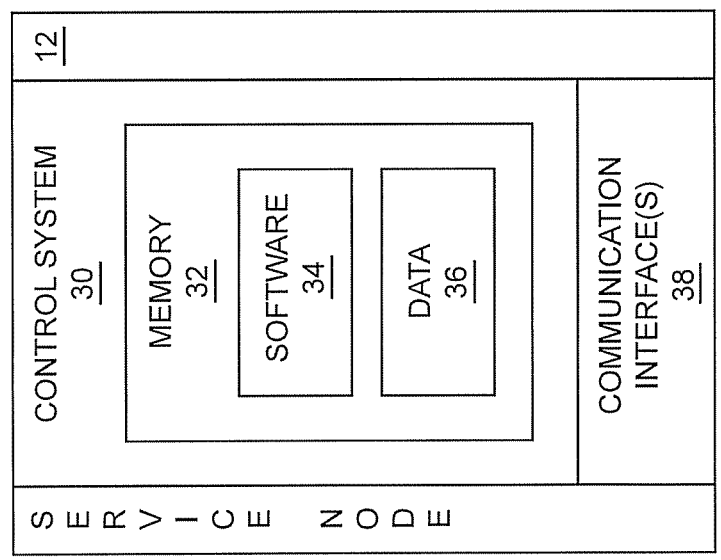
FIG. 5 is a block representation of a service node according to one embodiment of the disclosure.

With reference to FIG. 5, a block representation of the service node 12 is illustrated according to one embodiment. The service node 12 may include a control system 30 having sufficient memory 32 for the requisite software 34 and data 36 to operate as described above. The software 34 may provide the communication function, web server function, and interworking function, which are described above. The control system 30 may also be associated with one or more communication interfaces 38 to facilitate communications with the various entities illustrated in the communication environment 10, as well as any other entities being used during the implementation of the present invention.

Figure 6:
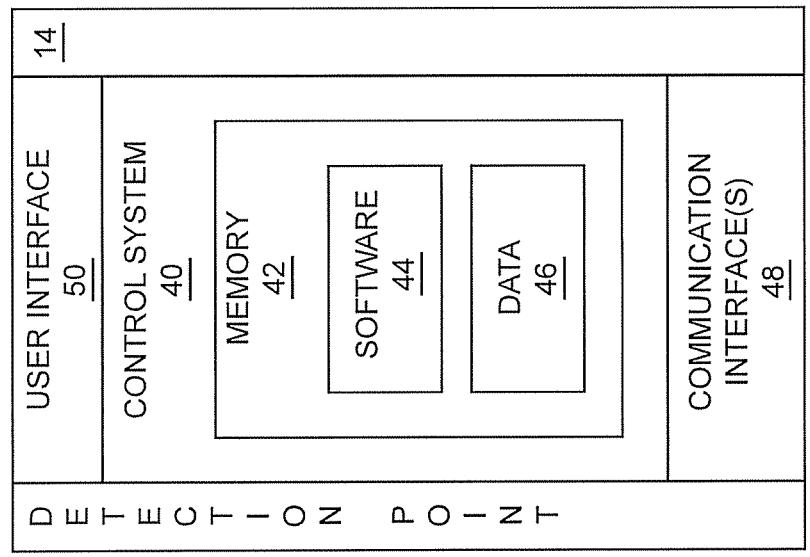
FIG. 6 is a block representation of a detection point according to one embodiment of the disclosure.

With reference to FIG. 6, a block representation of a detection point 14 is illustrated. The detection point 14 may represent a personal computer or the like and may include a control system 40 having sufficient memory 42 for the requisite software 44 and data 46 to operate as described above. The control system 40 may be associated with one or more communication interfaces 48 to facilitate communications as described above, as well as a user interface 50. The user interface 50 may include input devices such as a keypad, mouse, touchscreen, microphone, and the like, as well as one or more output mechanisms, including speakers, displays, and the like.

Those skilled in the art will recognize improvements and modifications to the embodiments of the present invention. All such improvements and modifications are considered within the scope of the concepts disclosed herein and the claims that follow.

What is claimed is:

1. A method for performing configurable actions based upon detection of one or more mobile phones comprising:
   receiving from a detection point an identifier for each of one or more mobile phones detected within a detection perimeter associated with the detection point;
   filtering the identifier to determine a change in status for each of the one or more mobile phones, wherein the filtering comprises identifying ones of the mobile phones that are associated with stored user information of a communication environment; and
   performing at least one action based upon at least one of the determined changes in status for each of the one or more mobile phones.

2. The method of claim 1 further comprising performing at least one additional action based upon a detection of a loss of communication with the detection point.

3. The method of claim 2 where the at least one additional action comprises querying a status of at least one of the one or more mobile phones via a public mobile network.

4. The method of claim 1 wherein the determined change in status for each of the one or more mobile phones is indicative of the mobile phone entering into the detection perimeter associated with the detection point.

5. The method of claim 4 wherein the action comprises directing a call server to alter call routing to one or more communication devices associated with a user of the mobile phone.

6. The method of claim 5 wherein altering the call routing comprises simultaneously ringing the mobile phone and at least one voice terminal associated with the user.

7. The method of claim 4 wherein the action comprises transmitting the determined change in status for the mobile phone to one or more recipients.

8. The method of claim 7 wherein the determined change in status is transmitted via at least one of email, Short Message Service (SMS), and Instant Messaging (IM).

9. The method of claim 7 wherein the determined change in status is transmitted to a social network associated with a user of the mobile phone.

10. The method of claim 1 further comprising, when the determined change in status for each of the one or more mobile phones is indicative of the mobile phone leaving the detection perimeter associated with the detection point, altering a detection parameter.

11. The method of claim 10 wherein the detection parameter is a detection signal strength parameter.

12. The method of claim 10 wherein the detection parameter is a frequency at which the detection point queries for a presence of the mobile phone.

13. The method of claim 1 wherein the detection point operates to detect each of the one or more mobile phones via at least one of Bluetooth communication and Radio Frequency Identification (RFID) interrogation.

14. The method of claim 1 wherein the action comprises updating a user profile of a user associated with the one or more mobile phones for which there was the determined change in status.

15. The method of claim 14 wherein updating the user profile comprises updating an image associated with the user.

16. The method of claim 1 wherein the at least one action is configurable by a user of the one or more mobile phones.

17. The method of claim 1 wherein the at least one action is based upon an identity of the detection point.

18. The method of claim 1 wherein the at least on action depends on a current network address of the detection point.

19. A service node for performing configurable actions based upon detection of one or more mobile phones comprising:
at least one communication interface; and
a control system associated with the at least one communication interface and adapted to:
receive from a detection point an identifier for each of one or more mobile phones detected within a detection perimeter associated with the detection point;
filter the identifier to determine a change in status for each of the one or more mobile phones, wherein filtering comprises filtering out other ones of the mobile devices that are not associated with stored user information of the communication environment; and
perform an action based upon at least one of the determined changes in status for each of the one or more mobile phones.

20. The service node of claim 19 wherein the determined change in status for each of the one or more mobile phones is indicative of the mobile device entering into the detection perimeter associated with the detection point.

21. The service node of claim 20 wherein the action comprises directing a call server to forward calls to the mobile phone to at least one voice terminal associated with the detection point.

22. The service node of claim 20 wherein the action comprises transmitting the determined change in status for the mobile phone to one or more recipients.

23. The service node of claim 22 wherein the determined change in status is transmitted via at least one of email, Short Message Service (SMS), and Instant Messaging (IM).

24. The service node of claim 22 wherein the determined change in status is transmitted to a social network associated with a user of the mobile phone.

25. The service node of claim 19 wherein the control system is further adapted to, when the determined change in status for each of the one or more mobile phones is indicative of the mobile phone leaving into the detection perimeter associated with the detection point, transmit a request to the detection point to query for the presence of the mobile phone.

26. The service node of claim 25 wherein the control system is further adapted to instruct the detection point to alter a detection parameter.

27. The service node of claim 26 wherein the detection parameter is a detection signal strength parameter.

28. The service node of claim 19 wherein the detection point operates to detect each of the one or more mobile phones via at least one of Bluetooth communication and Radio Frequency Identification (RFID) interrogation.

29. The service node of claim 19 wherein the action comprises updating a user profile of a user associated with the one or more mobile phones for which there was the determined change in status.

30. The service node of claim 29 wherein updating the user profile comprises updating an image associated with the user.

31. The service node of claim 19 wherein the control system is further adapted to, when the determined change in status for each of the one or more mobile phones is indicative of the mobile phone leaving into the detection perimeter associated with the detection point, transmit a request to the detection point to increase a frequency at which the detection point queries for the presence of the mobile phone.

32. The service node of claim 19 wherein the action is configurable by a user of the one or more mobile phones.

33. The method of claim 1 wherein the filtering further comprises filtering out other ones of the mobile devices that are not associated with stored user information of the communication environment.

* * * * *